United States Patent
Ryon et al.

(10) Patent No.: US 11,674,445 B2
(45) Date of Patent: Jun. 13, 2023

(54) COOLING FOR CONTINUOUS IGNITION DEVICES

(71) Applicant: Delavan Inc., West Des Moines, IA (US)

(72) Inventors: Jason Ryon, Carlisle, IA (US); Lev A. Prociw, Johnston, IA (US)

(73) Assignee: Collins Engine Nozzles, Inc., Des Moines, IA (US)

(*) Notice: Subject to any disclaimer, the term of this patent is extended or adjusted under 35 U.S.C. 154(b) by 0 days.

(21) Appl. No.: 17/460,690

(22) Filed: Aug. 30, 2021

(65) Prior Publication Data
US 2023/0064335 A1 Mar. 2, 2023

(51) Int. Cl.
*F02C 7/264* (2006.01)
*F01D 25/12* (2006.01)

(52) U.S. Cl.
CPC .............. *F02C 7/264* (2013.01); *F01D 25/12* (2013.01); *F05D 2240/35* (2013.01); *F05D 2260/201* (2013.01); *F05D 2260/202* (2013.01); *F05D 2260/232* (2013.01); *F05D 2260/30* (2013.01)

(58) Field of Classification Search
CPC .... F02C 7/26; F02C 7/264; F02C 7/18; F02C 7/22; F02C 7/28; F02C 7/266; F23R 3/283; F23R 3/045; F23R 3/343; F23R 3/14; F23R 3/20; F23R 3/28
See application file for complete search history.

(56) References Cited

U.S. PATENT DOCUMENTS

| | | | |
|---|---|---|---|
| 3,869,864 A * | 3/1975 | Bunn | F23R 3/12 60/749 |
| 4,112,675 A | 9/1978 | Pillsbury et al. | |
| 4,860,533 A | 8/1989 | Joshi | |
| 4,949,545 A * | 8/1990 | Shekleton | F23R 3/08 60/757 |
| 5,085,040 A | 2/1992 | Tilston | |
| 5,894,720 A | 4/1999 | Willis et al. | |
| 7,216,488 B2 * | 5/2007 | Howell | F23R 3/283 60/776 |
| 10,584,639 B2 | 3/2020 | Dam et al. | |
| 10,711,699 B2 * | 7/2020 | Dam | F02C 7/18 |

(Continued)

FOREIGN PATENT DOCUMENTS

JP 2015021715 A 2/2015

OTHER PUBLICATIONS

Extended European Search Report dated Jan. 16, 2023, issued during the prosecution of European Patent Application No. EP 22192547.2.

(Continued)

*Primary Examiner* — Craig Kim
(74) *Attorney, Agent, or Firm* — Locke Lord LLP; Joshua L. Jones; Scott D. Wofsy

(57) ABSTRACT

A torch ignitor system includes a torch wall defining a combustion chamber therein with a flame outlet passing out of the torch wall downstream of the combustion chamber. A fuel injector is mounted to the torch wall to issue fuel into the combustion chamber. At least one ignitor is mounted to the torch wall, positioned to ignite fuel issued from the fuel injector. A film cooler is defined through the torch wall and is operative to issue a film of cooling air from outside the torch wall along an interior surface of the combustion chamber for cooling the torch wall.

12 Claims, 4 Drawing Sheets

(56) References Cited

U.S. PATENT DOCUMENTS

| | | | |
|---|---|---|---|
| 11,384,644 B2* | 7/2022 | Tsuru | F01D 9/065 |
| 2003/0115886 A1* | 6/2003 | Farmer | B23K 26/244 |
| | | | 219/121.64 |
| 2004/0168442 A1 | 9/2004 | Schmotolocha et al. | |
| 2005/0053876 A1 | 3/2005 | Joos et al. | |
| 2005/0284442 A1 | 12/2005 | Stuttaford et al. | |
| 2009/0235666 A1* | 9/2009 | Tuttle | F23R 3/343 |
| | | | 29/890.01 |
| 2010/0251719 A1* | 10/2010 | Mancini | F23R 3/343 |
| | | | 60/737 |
| 2014/0366505 A1 | 12/2014 | Prociw et al. | |
| 2014/0366551 A1* | 12/2014 | Prociw | F23R 3/28 |
| | | | 60/776 |
| 2016/0102860 A1* | 4/2016 | Chandler | B05D 3/12 |
| | | | 60/754 |
| 2017/0234139 A1* | 8/2017 | Bunker | F01D 5/187 |
| | | | 60/722 |
| 2017/0284674 A1* | 10/2017 | Perveiler | F01D 25/12 |
| 2018/0100437 A1 | 4/2018 | DiCintio et al. | |
| 2018/0187888 A1* | 7/2018 | Tangirala | F23R 3/04 |
| 2018/0252410 A1* | 9/2018 | Zelina | F23R 3/002 |
| 2018/0266324 A1* | 9/2018 | Lao | F23R 3/002 |
| 2019/0010872 A1 | 1/2019 | Dam et al. | |
| 2019/0010873 A1* | 1/2019 | Dam | F02C 7/18 |
| 2020/0309378 A1 | 10/2020 | Dam et al. | |
| 2021/0215100 A1 | 7/2021 | Head et al. | |
| 2022/0090560 A1* | 3/2022 | Lugg | F02K 7/18 |
| 2022/0195939 A1* | 6/2022 | Ryon | F02C 7/264 |

OTHER PUBLICATIONS

Database WPI/2017 Clarivate Analytics, 2 pages.

* cited by examiner

COOLING FOR CONTINUOUS IGNITION DEVICES

BACKGROUND

1. Field

The present disclosure relates to ignition devices, and more particularly to continuous ignition devices such as used for starting and relighting combustion in gas turbine engines.

2. Description of Related Art

A small, independent torch igniter system offers many advantages for gas turbine engines. It can provide an independent heat source from the main combustor which is used to ignite, stabilize, and relight the main combustor. The isolated nature of this system allows it to be stable regardless of the conditions within the main combustor. It provides rapid relight capabilities, e.g. in case a need arises to relight an engine at altitude. In some applications the walls of the dome and combustor as well as the exit nozzle can get very hot. Flame-facing surfaces of the torch ignitor must be adequately cooled to prevent oxidation of the material.

The conventional techniques have been considered satisfactory for their intended purpose. However, there is an ever present need for improved systems and methods for cooling torch ignitors. This disclosure provides a solution for this need.

SUMMARY

A torch ignitor system includes a torch wall defining a combustion chamber therein with a flame outlet passing out of the torch wall downstream of the combustion chamber. A fuel injector is mounted to the torch wall to issue fuel into the combustion chamber. At least one ignitor is mounted to the torch wall, positioned to ignite fuel issued from the fuel injector. A film cooler is defined through the torch wall and is operative to issue a film of cooling air from outside the torch wall along an interior surface of the combustion chamber for cooling the torch wall.

The film cooler can include a circumferential pattern of cooling holes defined through the torch wall. The cooling holes can be tangential relative to a longitudinal axis of the torch wall to impart swirl on the film of cooling air. The circumferential pattern of cooling holes can be a first circumferential pattern of cooling holes. At least one additional circumferential pattern of cooling holes can be defined through the torch wall. The first and additional sets of circumferential patterns of cooling holes can be spaced apart axially relative to the longitudinal axis.

A respective circumferentially extending louver can be included radially inward from each of the first and additional sets of circumferential patterns of cooling holes for impingement of air from the cooling holes on the louvers. Each louver can open in a downstream direction. The louvers can be mounted to an inner surface of the torch wall. Each louver can be integral with a separate segment of the torch wall, wherein the torch wall is an assembly of the separate segments nested together.

An outlet tube can be in fluid communication with the combustion chamber extending downstream from the flame outlet. At least one of the additional circumferential patterns of cooling holes can be located in the outlet tube and includes a circumferentially extending louvre.

At least one set of torch combustion air holes can be defined through the torch wall. The torch combustion air holes can be defined as tangential passages through the torch wall relative to the longitudinal axis. The torch combustion air holes can be free of louvers to issue combustion away from the torch wall toward the longitudinal axis.

The torch wall can be mounted to an engine case. A combustor can be included within the engine case. The flame outlet can be mounted in fluid communication with an interior combustion space of the combustor. The combustor can be spaced apart from the combustion chamber of the torch wall. A compressor discharge diffuser can be included in the engine case upstream of the torch wall and combustor. A mounting flange can extend from the torch wall and can be mounted to the engine case. The at least one ignitor can extend from outside the engine case, through the mounting flange and into the combustion chamber. The fuel injector can be mounted on an opposite side of the flange from the combustion chamber.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
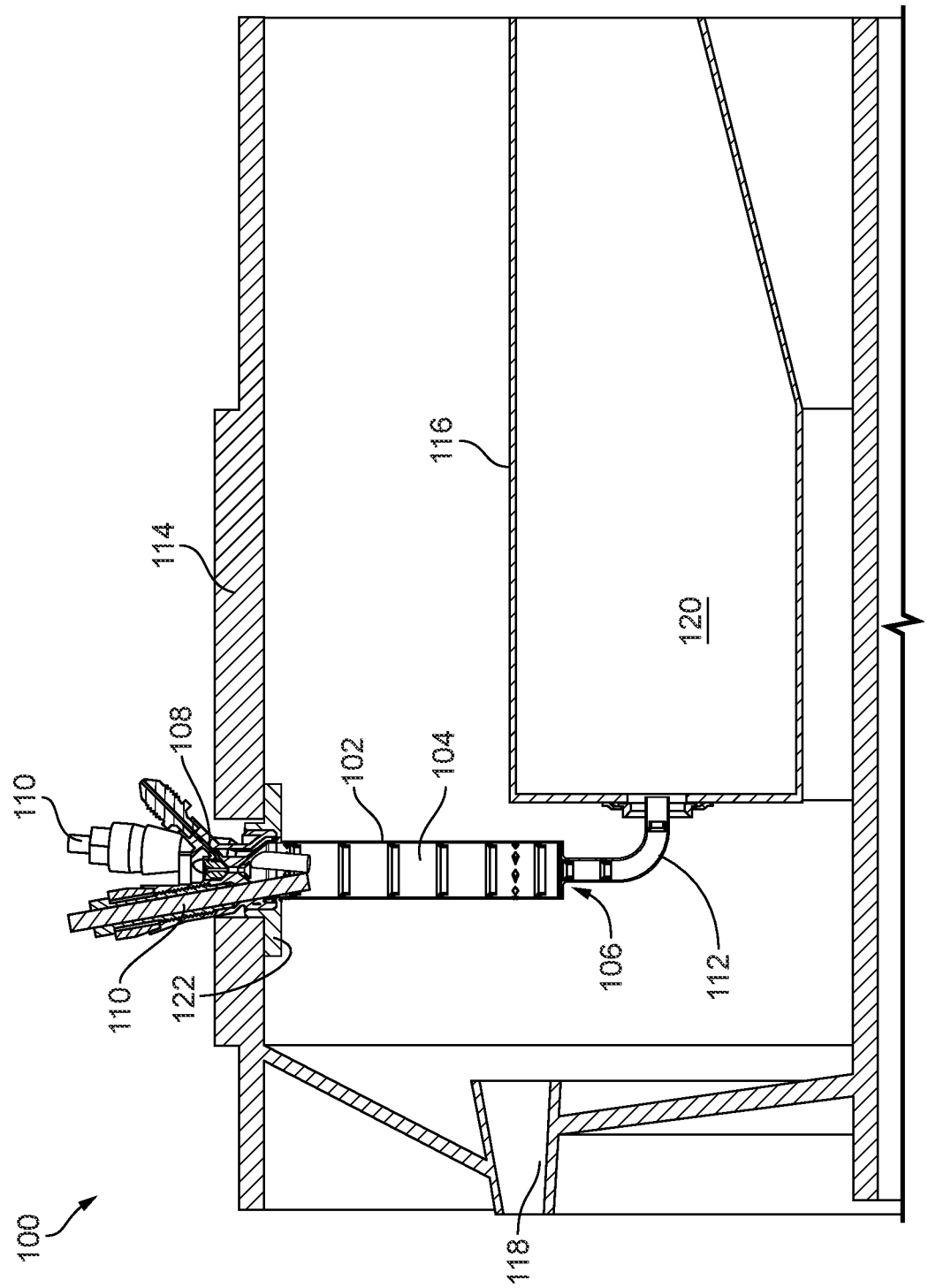
FIG. 1 is a schematic cross-sectional side elevation view of an embodiment of a system constructed in accordance with the present disclosure, showing the torch ignitor mounted to the engine case and combustor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide cooling for protecting torch ignitors used for continuous ignition in gas turbine engines.

The torch ignitor system 100 includes a torch wall 102 defining a combustion chamber 104 therein with a flame outlet 106 passing out of the torch wall 102 downstream of the combustion chamber 104. A fuel injector 108 is mounted to the torch wall 102 to issue fuel into the combustion chamber 104. At least one ignitor 110 is mounted to the torch wall 102, positioned to ignite fuel issued from the fuel injector. An outlet tube 112 is in fluid communication with the combustion chamber 104 extending downstream from the flame outlet 106.

The torch wall 102 is mounted to an engine case 114. A combustor 116 is included within the engine case 114, e.g. for receiving compressor discharge air from an upstream compressor (not shown but the diffuser 118 of the compressor is labeled in FIG. 1), combusting fuel in the compressor discharge air, and issuing combustion products to a downstream turbine, not pictured. The flame outlet 106 is mounted in fluid communication, through outlet tube 112, with an interior combustion space 120 of the combustor 116. The combustor 116 is a separate component that is spaced apart from the combustion chamber 104 of the torch wall 102, so at start up or in the event of a flame out in the main combustion space 120, a flame from the combustion chamber 104 can issue through the outlet tube 112 and into the combustion space 120 to light or relight the combustor 116.

The torch combustion chamber 104 is mostly isolated from the main combustor 116. The narrow outlet tube 112 acts as an isolator which limits communication between the two volumes. This isolation allows the torch combustion chamber 104 to be stable while the main combustor 116 could have strong pressure oscillations which happen during ignition, blowout, acoustic instabilities, and the like. The torch combustion chamber 104 is also generally sheltered from the main combustor flow field so recirculation patterns, high velocity zones, and the like do not make their way up into the torch combustion chamber 104.

A mounting flange 122 extends from the torch wall 102 and is mounted to the engine case 114. The ignitors 110 extend from outside the engine case 114, through the mounting flange 112 and into the combustion chamber 104 for igniting a mixture of fuel and air from the fuel injector 108 to start up the torch ignitor system 100. The fuel injector 108 is mounted on an opposite side of the flange 122 from the combustion chamber 104.

Figure 2:
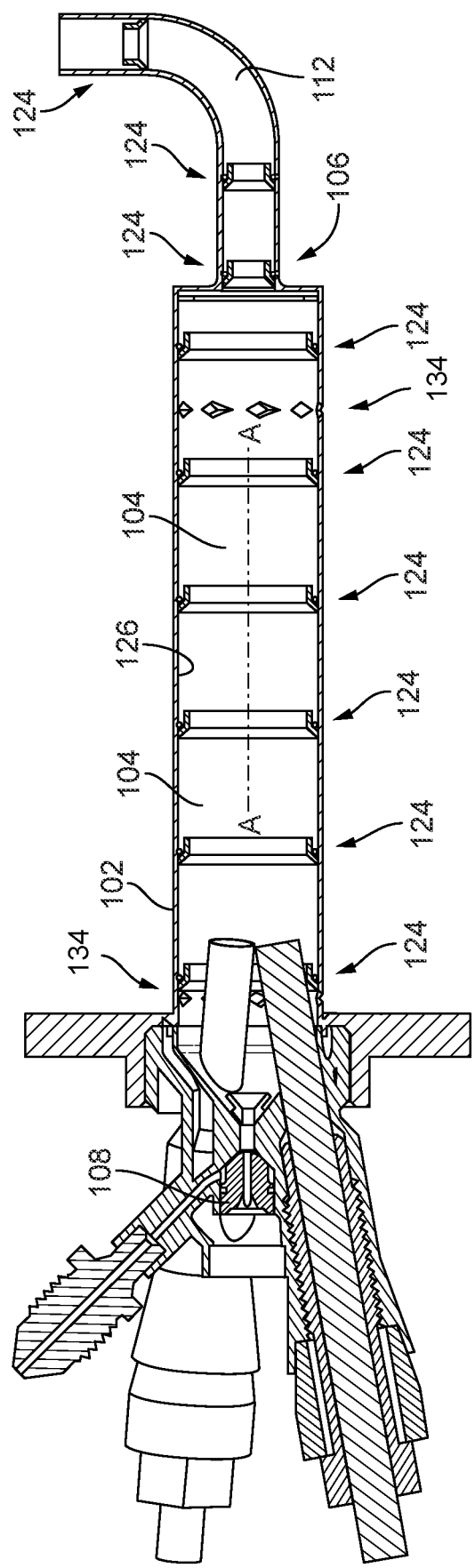
FIG. 2 is a schematic cross-sectional side elevation view of the torch ignitor of FIG. 1, showing the film coolers.

With reference now to FIG. 2, a plurality of film coolers 124 are defined through the torch wall 102, which are operative to issue a film of cooling air from outside the torch wall 102 along an interior surface 126 of the combustion chamber 104 for cooling the torch wall 102. The air from outside the torch wall 102 for the film coolers 124 comes from the compressor discharge cavity downstream of diffuser 118 in the same way that the main fuel nozzles and main combustor 116 receive their air. This air has a higher pressure than internal to the torch combustion chamber 104, which drives the air into the torch combustion chamber 104.

Figure 3:
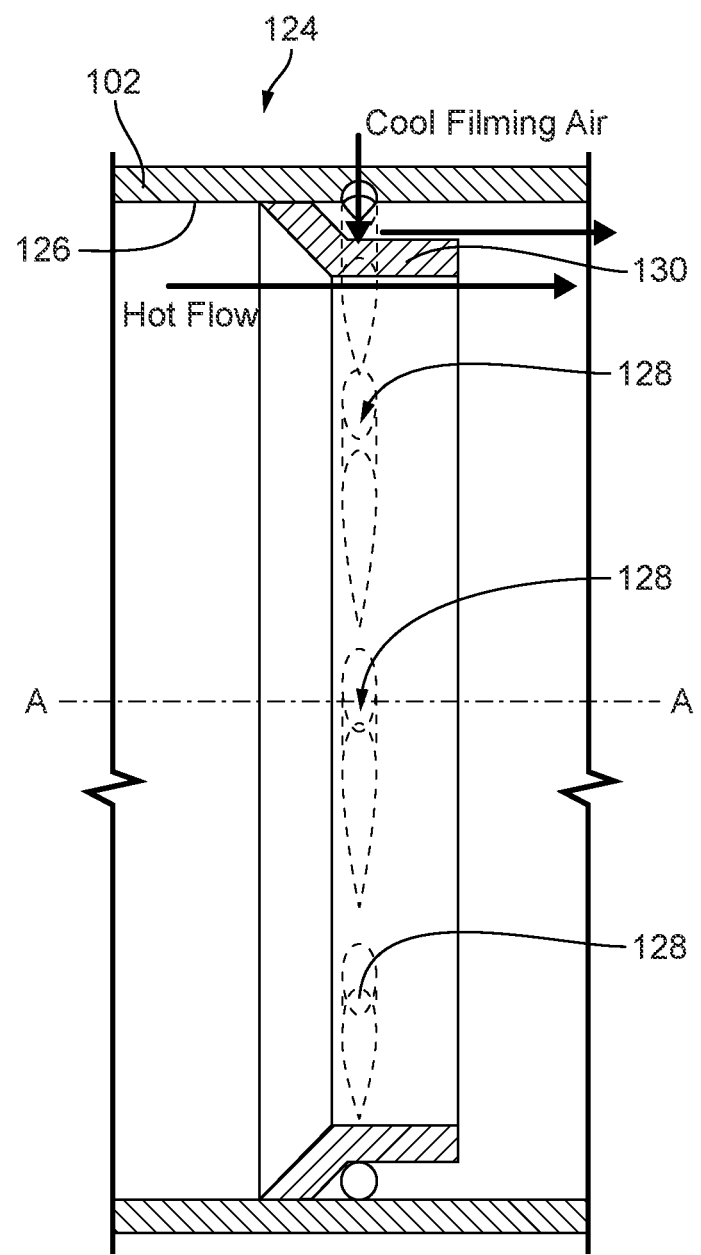
FIG. 3 is a schematic cross-sectional side elevation view of one of the film coolers of FIG. 2, showing the cooling holes and a louver.
Figure 4:
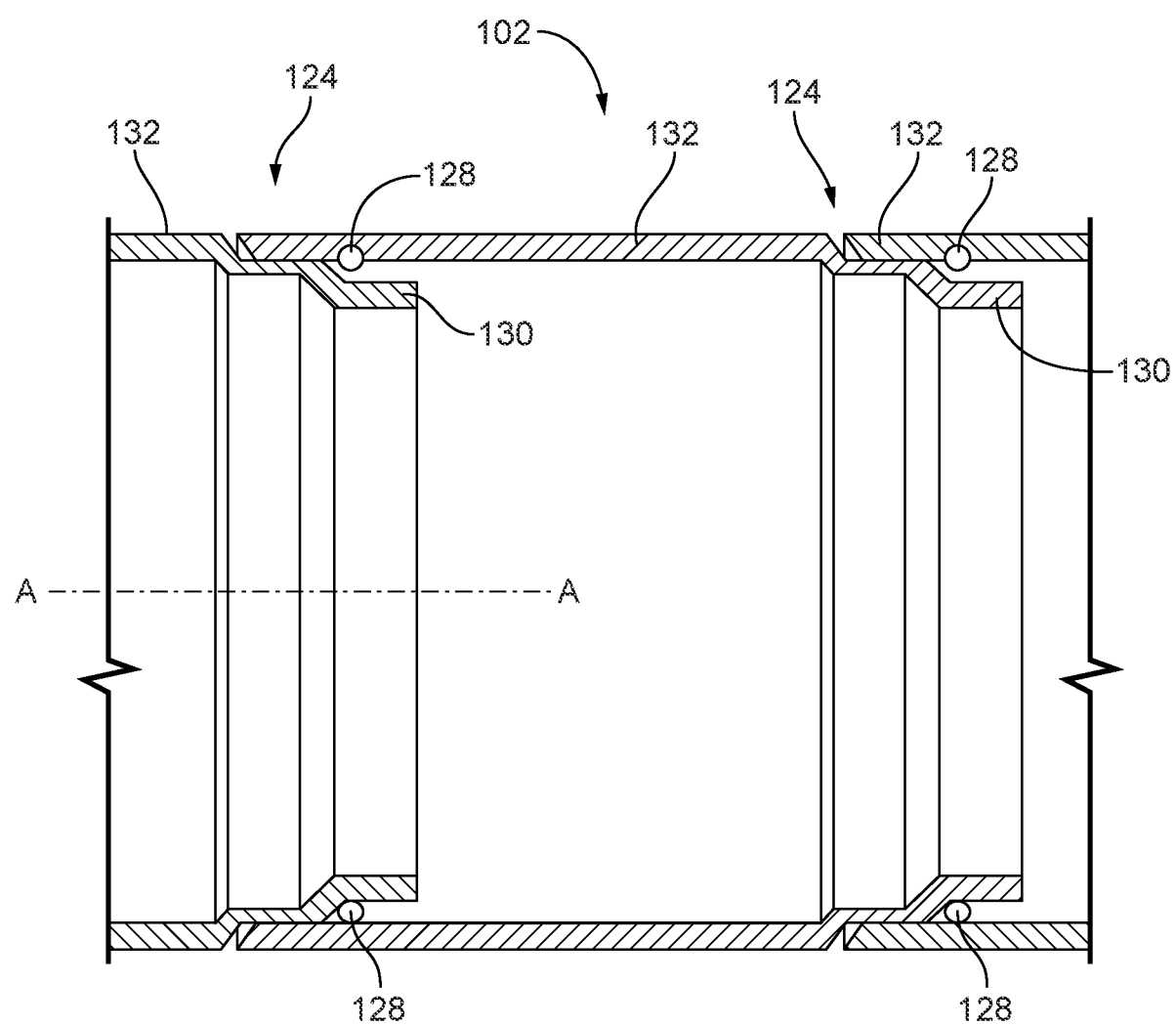
FIG. 4 is a schematic cross-sectional side elevation view of the torch wall another torch ignitor, showing nested segments assembled into a torch wall.

The outlet tube 112 can include one or more similar film coolers 124. FIG. 3 shows a detail of one of the film coolers 124. The film cooler 124 includes a circumferential pattern of cooling holes 128 defined through the torch wall 102. The cooling holes 128 are tangential relative to a longitudinal axis A of the torch wall 102 to impart swirl on the film of cooling air, i.e. swirling around the cylindrical inner surface 126 of the torch wall 102. As shown in FIG. 2, the sets of circumferential patterns of cooling holes 128 of the film coolers 124 are spaced apart axially relative to the longitudinal axis A.

Referring again to FIG. 3, a respective circumferentially extending louver 130 is included in each film cooler 124. The louver 130 is radially inward from its circumferential pattern of cooling holes 128 for impingement of cooling film air from the cooling holes 128 onto the louver 130. Each louver 130 opens in a downstream direction to redirect air from the cooling holes 128 along the inner surface 126 as indicated by the flow arrows in FIG. 3. The louvers 130 are mounted to the inner surface 126 of the torch wall 102. In another configuration, shown in FIG. 4, each louver 130 is integral with a separate segment 132 of the torch wall 102, wherein the torch wall 102 is an assembly of the separate segments 132 nested together. The louvers 130 of FIG. 3 can be brazed or welded to the inner surface 126 of the torch wall 102. Similarly, the segments 132 of FIG. 4 can be welded or brazed together in the nested configuration to form the torch wall 102 and film coolers 124. It is also contemplated that the torch wall 102 and/or film coolers 124 can be made using additive manufacturing.

With reference again to FIG. 2, two sets of torch combustion air holes 134 are defined through the torch wall 102 for admitting air into the combustion chamber 104 for use in combusting fuel from the fuel injector 108. The torch combustion air holes 134 are defined as tangential passages through the torch wall 102 relative to the longitudinal axis A. The torch combustion air holes are free of louvers to issue combustion away from the torch wall toward the longitudinal axis A.

Potential benefits of the film cooler 124 include allowing for use of metallic components (e.g. in torch wall 102) to be used which do not need as exotic of temperature limits as would be needed without the film coolers 124 in continuous ignition torch ignitors. The film coolers 124 can be made lighter in weight than back-side cooled (double skinned) combustor liners.

The methods and systems of the present disclosure, as described above and shown in the drawings, provide for cooling for protecting torch ignitors used for continuous ignition in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A torch ignitor system comprising:
   a torch wall defining a combustion chamber therein with a flame outlet passing out of the torch wall downstream of the combustion chamber;
   a fuel injector mounted to the torch wall to issue fuel into the combustion chamber;
   at least one ignitor mounted to the torch wall, positioned to ignite fuel issued from the fuel injector; and
   a film cooler defined through the torch wall and operative to issue a film of cooling air from outside the torch wall along an interior surface of the combustion chamber for cooling the torch wall, wherein the film cooler includes a circumferential pattern of cooling holes defined through the torch wall, wherein the cooling holes are tangential relative to a longitudinal axis of the torch wall, further comprising a circumferentially extending louver radially inward from the circumferential pattern of cooling holes for impingement of air from the cooling holes on the louver, wherein the louver opens in a downstream direction.

2. The system as recited in claim 1, wherein the circumferential pattern of cooling holes is a first circumferential pattern of cooling holes and further comprising at least one second circumferential pattern of cooling holes defined through the torch wall, wherein the first and additional sets of circumferential patterns of cooling holes are spaced apart axially relative to the longitudinal axis.

3. The system as recited in claim 1, wherein the louver is mounted to an inner surface of the torch wall.

4. The system as recited in claim 1, wherein the louver is integral with a separate segment of the torch wall, wherein the torch wall is an assembly of the separate segments nested together.

5. The system as recited in claim 2, further comprising an outlet tube in fluid communication with the combustion chamber extending downstream from the flame outlet, wherein at least one of the additional circumferential patterns of cooling holes is located in the outlet tube and includes a circumferentially extending louvre.

6. The system as recited in claim 2, further comprising at least one set of torch combustion air holes defined through the torch wall, wherein the torch combustion air holes are defined as tangential passages through the torch wall relative to the longitudinal axis, wherein the torch combustion air holes are free of louvers to issue combustion away from the torch wall toward the longitudinal axis.

7. The system as recited in claim 1, further comprising an engine case, wherein the torch wall is mounted to the engine case.

8. The system as recited in claim 7, further comprising a combustor within the engine case, wherein the flame outlet is mounted in fluid communication with an interior combustion space of the combustor, wherein the combustor is spaced apart from the combustion chamber of the torch wall.

9. The system as recited in claim 8, further comprising a compressor discharge diffuser in the engine case upstream of the torch wall and combustor.

10. The system as recited in claim 9, wherein a mounting flange extends from the torch wall and is mounted to the engine case.

11. The system as recited in claim 7, wherein the at least one ignitor extends from outside the engine case, through the mounting flange and into the combustion chamber.

12. The system as recited in claim 11, wherein the fuel injector is mounted on an opposite side of the flange from the combustion chamber.

* * * * *